(12) United States Patent
Li et al.

(10) Patent No.: US 10,921,882 B1
(45) Date of Patent: Feb. 16, 2021

(54) HUMAN-MACHINE INTERACTION METHOD, SYSTEM AND APPARATUS FOR CONTROLLING AN ELECTRONIC DEVICE

(71) Applicant: Jie Li, Guangzhou (CN)

(72) Inventors: Jie Li, Guangzhou (CN); Yanghui Li, Guangzhou (CN)

( * ) Notice: Subject to any disclaimer, the term of this patent is extended or adjusted under 35 U.S.C. 154(b) by 0 days.

(21) Appl. No.: 16/727,069

(22) Filed: Dec. 26, 2019

(51) Int. Cl.
  *G06F 3/01* (2006.01)
  *G06F 3/0346* (2013.01)
  *H04R 1/10* (2006.01)
  *G06F 3/038* (2013.01)
  *G06F 3/16* (2006.01)

(52) U.S. Cl.
  CPC .............. *G06F 3/012* (2013.01); *G06F 3/038* (2013.01); *G06F 3/0346* (2013.01); *G06F 3/167* (2013.01); *H04R 1/10* (2013.01); *G06F 2203/0384* (2013.01)

(58) Field of Classification Search
  CPC ........... G06F 3/0346; G06F 2203/0384; G06F 3/038; G06F 3/012; G06F 3/167; H04R 1/10
  See application file for complete search history.

(56) References Cited

U.S. PATENT DOCUMENTS

| | | | | |
|---|---|---|---|---|
| 6,727,887 | B1* | 4/2004 | Levine | G06F 3/0308 345/157 |
| 2012/0229248 | A1* | 9/2012 | Parshionikar | G08B 21/06 340/3.1 |
| 2017/0216099 | A1* | 8/2017 | Saladino | A41D 3/005 |
| 2020/0004328 | A1* | 1/2020 | Blume | G06F 3/012 |

* cited by examiner

*Primary Examiner* — Muhammad N Edun

(57) ABSTRACT

A human-machine interaction method, system and apparatus of the present invention enables a user to interact with an electronic device by turning the user's head to implement a mouse's point-and-click functionality. A main characteristic is to detect the user's head rotation (moving direction, displacement and nod/shake one's head action) following the direction of eye watching by adding an angular velocity sensor in an earphone, so as to realize a more natural and convenient human-machine interaction, where you are watching is where the cursor will point, look-and-nod instead of point-and-click with mouse. With the supports of the virtual keyboard on the screen of the electronic device, information can be inputted. Combined with the earphone microphone sound input, it can realize more complicated control combination with head movement input and sound input; making use of the earphone sound output as user output, user input and user output are integrated in one.

4 Claims, 15 Drawing Sheets

HUMAN-MACHINE INTERACTION METHOD, SYSTEM AND APPARATUS FOR CONTROLLING AN ELECTRONIC DEVICE

BACKGROUND OF THE INVENTION

1. Field of the Invention

This invention relates to a human-machine interaction method, system and apparatus, particular to a human-machine interaction method, system and apparatus for realizing human-machine communication through the user's head point-and-click to control electronic products and input information.

2. Related Art

Human-machine interaction (HMI) system consists of user input devices and user output devices. The user output devices have passed through a procedure of evolution from the earliest printers and indicators to the commonly used display screens, even 3D image projection, virtual reality and augmented reality.

User input technology is an important part of human-machine interaction, which directly affects the user's experience and efficiency. The user input device has also evolved from the earliest buttons, keyboard, keypad, mouse, voice input, and stylus to present capacitive touch screen, and almost all the operations can be completed by touching screen without using the stylus. The input methods are becoming more and more natural and convenient.

Every advance in human-machine interaction technology has brought revolution to IT industry, the graphical interface created by the Windows and Macintosh in the computer age allows us to do all the operation with the mouse's point-and-click; In the era of the Touch Screen mobile phone, many people will never forget the novelty they experienced when they first saw a picture on the screen zoomed in/out through the opening and closing of their fingers in an advertisement.

The current touch screen is very easy to use, but as the electronic device becomes smaller and smaller, the touch screen is getting smaller and smaller, the finger will not become smaller, the size of a finger will prevent that user from easily pressing one key of the small virtual QWERTY keyboard on screen, easy to mistakenly type in letter or number near finger; On the other hand, for some users who are inconvenient to free their hands, such as car drivers, disabled people, workers with tools, firefighters, polices, etc., Touch Screen input is not a good choice; the capacitive Touch Screen is not a good choice for those wearing gloves too; the hand gesture input also needs hands, is not a good choice, is there a more convenient and natural input method than Touch Screen? and can the users free their hands to do other things?

Face recognition is now popular, but only for access authorization, such as unlocking the phone. Since the face recognition technology based on computer vision is so mature, it is easy to recognize facial expressions and movements, why not use it as a human-machine interaction?

Originally, face recognition was supposed to be used to detect facial expression and movement as user input. Later, it was found that face recognition technology based on optical photography had low recognition rate when the light was weak, and higher power consumption. Although Apple Inc. used infrared camera to solve the problem of low recognition rate caused by weak light after iPhone x, it still had high power consumption problem and is not suitable for human-machine interaction.

Optical emitters and photo detector or TOF (Time of Flight) are also used to track the head or eyeball movement, but these methods need to emit infra light or laser light and reflect through eyeball, which is not good for eyes.

In view of the above existing factors, how to control electronic products through human-machine interaction for solving operational convenience is indeed a subject worth exploring.

SUMMARY OF THE INVENTION

The object of the invention is to provide a human-machine interaction method, system and apparatus, which realizes human-machine communication through user's head point-and-click, for controlling electronic products and inputting information.

The simplest human-machine interaction system consists of user input and user output devices. For example, the most common user output device is the screen, and the most common user input device is buttons. All the input operations can be completed with a simple 5-directions navigation key. The 5-directions navigation key include 4 direction keys (Left, Right, Up, Down) plus ENTER key. If you add a BACKSPACE button, it is better, operation can be faster.

The mouse is to simulate the 5-directions navigation key, mouse point-and-click can complete all input operations. The present invention simulates the behavior of the mouse to realize the point-and-click function, moving user's head is equivalent to moving the mouse to perform pointing, which is also equivalent to move the 4 direction keys of the navigation key to point the cursor to the target, move the head, and the cursor is moved in the direction following the head moves; nodding to click, is equivalent to pressing the ENTER button; shaking user's head, equivalent to pressing the backspace/ESC button.

In this way, it is no longer necessary to sit on the table and move the mouse, or wave the laser pointer without occupying too much space for operation, and there is no need to leave a 2D surface plane space for mouse movement. It can be used in free 3D space, achieve the convenience of operation.

Details of embodiments and other functions of the present disclosure invention are illustrated as the follow drawings.

BRIEF DESCRIPTION OF THE DRAWINGS

In order to more clearly illustrate the embodiments of the present invention or the technical solution, the drawings used in the embodiments or the description of the technical solution will be briefly described below. Obviously, the drawings in the following description are only some embodiments recorded in the invention. Those skilled in the art will easy to obtain other drawing according to these drawings without any creative work.

DESCRIPTION OF THE INVENTION

The embodiments of the present invention are described below with reference to the attached drawings, and the invention will be described more fully. However, the invention should not be construed as being limited to the embodiments set forth herein. In contrast, the embodiments are provided so that this disclosure will be thorough and complete, and the scope of the invention will be fully understood by those skilled in the art.

Please refer to FIG. 1 to FIG. 7G for further understanding of the usage and implementation principle of the present invention.

Figure 1:
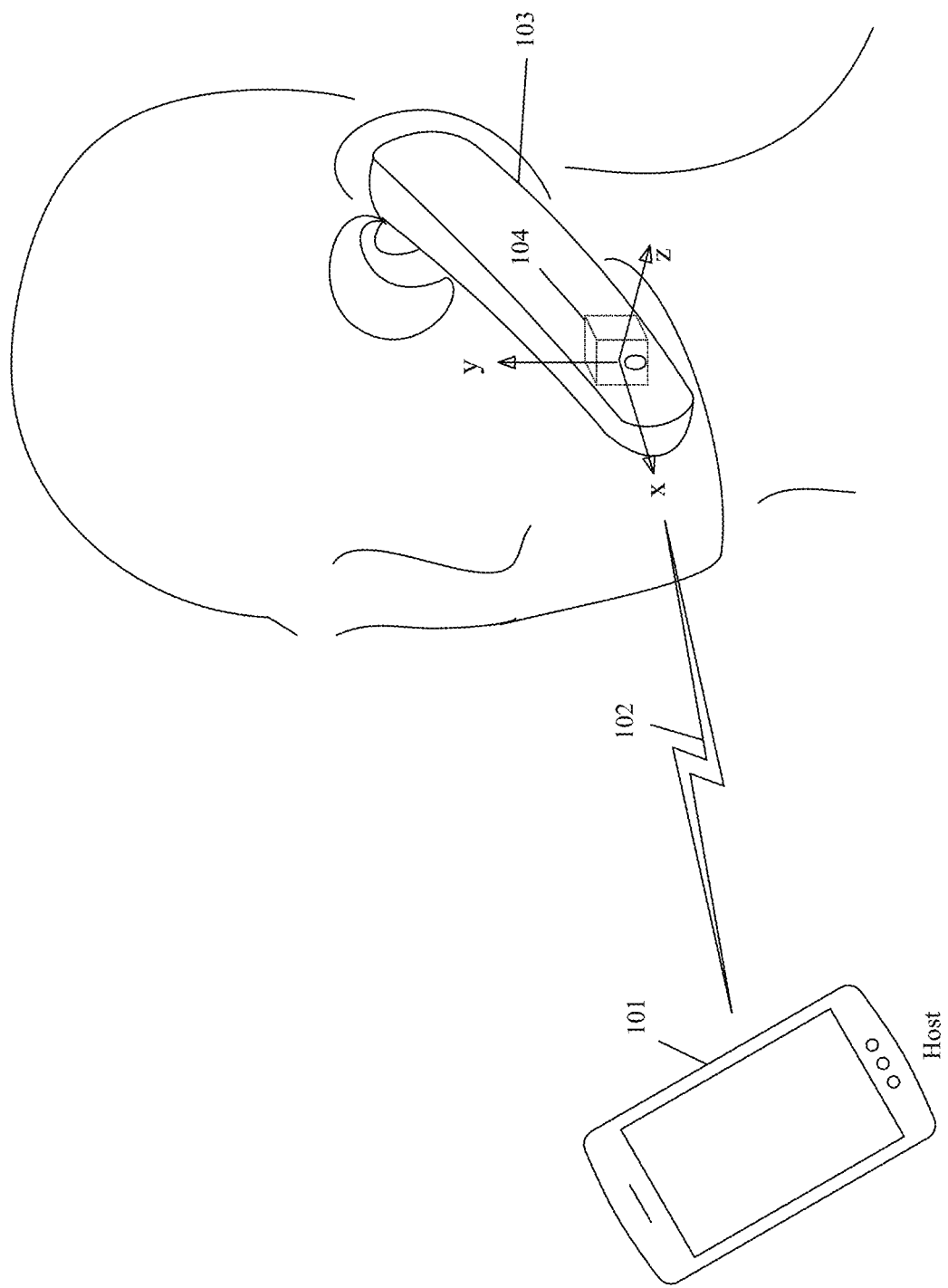
FIG. 1 is an application example of human-machine interaction in the present invention.

Refer to FIG. 1, a Bluetooth earphone 103 is selected as a carrier for following the movement of the head, and a rotation sensor 104 is added to the earphone 103 to detect and sense the movement of user's head (moving direction, displacement and nodding/shaking head action) following the direction of eye watching, track the head motion, encode the detected motion events into corresponding control commands, and then transmit them to the electronic device 101 to be controlled via wireless or wired connectivity 102 (such as Bluetooth).

After receiving the control command, the electronic device 101 explains the instruction and executes the corresponding preset action shown in the corresponding control action table of the preset head motion events 303, 304.

The user can point the cursor by moving his head, and the distance the cursor moves is proportional to the displacement of the head movement; nodding for clicking, shaking the user's head for escaping or backspacing.

Combined with the earphone microphone 209 sound input, it can realize more complicated control combination with head movement input and sound input, for example: whistle and head up to zoom in the picture, whistle and head down to zoom out the picture.

Thus, realize a more natural and convenient human-machine interaction, where you are watching is where the cursor will point, look-and-nod instead of point-and-click with mouse, furthermore, with the supports of the virtual keyboard 502 on the screen of the electronic device 101, it can input information too.

Making use of the earphone sound output as user output (such as output voice prompt or voice menu), user input and user output are integrated in one.

For simple electronic devices (such as music players, voice pager) that do not need to output a complicated user interface, no need the screen, simply use this user input and output 2-in-1 device to follow the voice prompts, nod or shake the head to complete the human-machine interaction.

In the present embodiment, an earphone is selected instead of eyeglasses or other wearable devices as a carrier, the reason is to reduce the foreign body sensation and consider that those who wear eyeglasses can no longer wear more eyeglasses. Another reason is that you can do more controlling combination with the earphone microphone sound input and the user's head movement.

Figure 2:
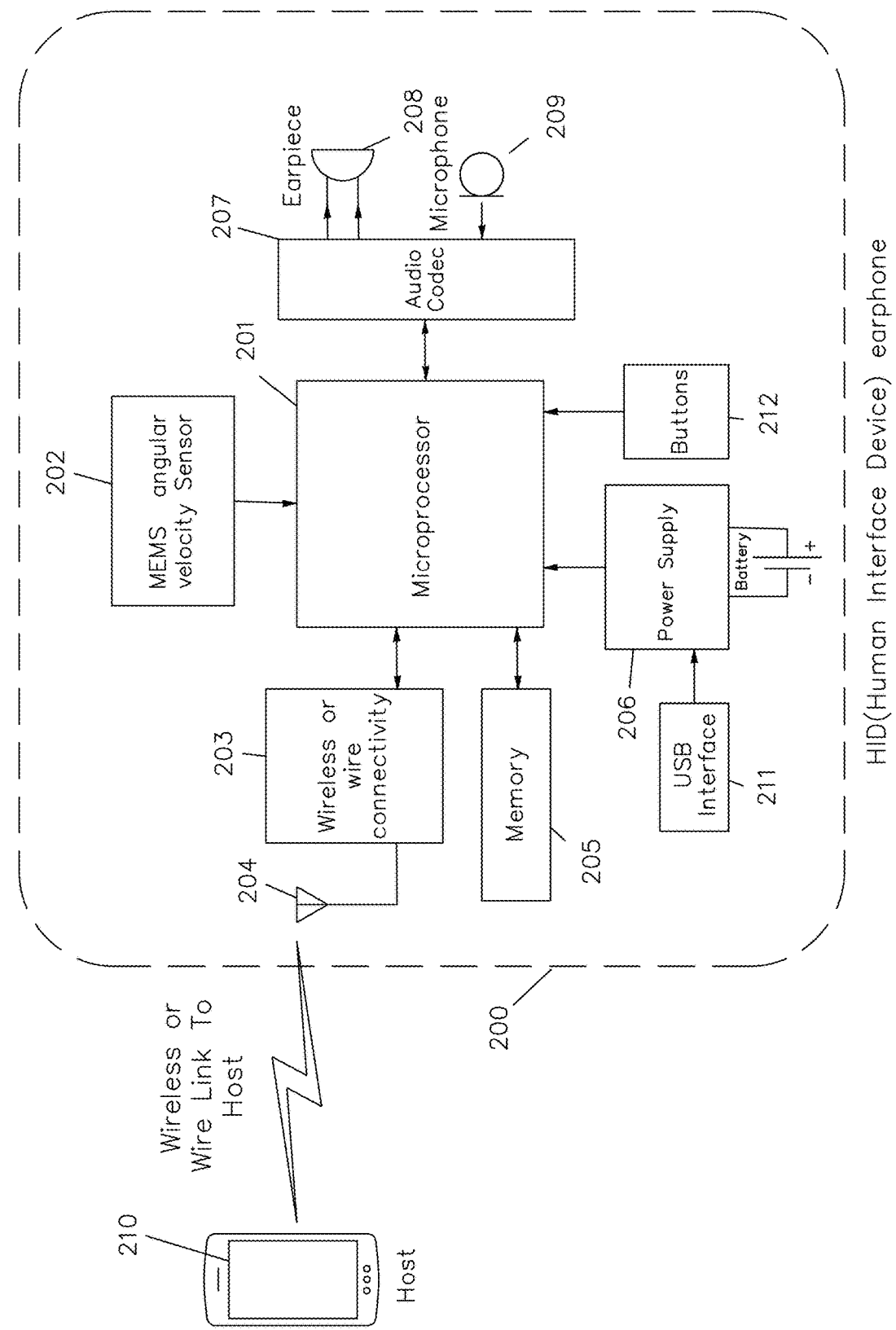
FIG. 2 is the block diagram of a preferred embodiment of human-machine interaction in the present invention.

Please refer to FIG. 2 to illustrate the system composition and apparatus of the present invention. The system consists of two parts: HID (Human Interface Device) earphone 200 and the electronic device (host) 210. The two parts are connected by wireless (such as Bluetooth/Zigbee/WiFi, etc.) or wired connectivity 102. The HID earphone 200 comprises a MEMS (Microelectro Mechanical Systems) angular velocity sensor 202, a microprocessor 201, a microphone 209, an earpiece 208, an audio codec (ADC/DAC converter) 207, a memory 205, a wireless or wired connectivity 203, an antenna or a wire 204, a power supply 206, an USB interface 211 and a charger, and a power on/off/pairing buttons 212. The MEMS angular velocity sensor 202 is mounted in a position that the y-axis of the MEMS angular velocity sensor is parallel to the yaw axis of the user's head rotation and the z-axis is parallel to the pitch axis of the user's head rotation, and the x-axis is parallel to the roll axis of the user's head (FIG. 6), so as to detect and recognize the user's head rotation (including a moving direction, a displacement and a nodding/shaking head action) following a direction of eye watching. A high-pass filter built in the MEMS angular velocity sensor filters out a low-frequency static noise after a debounce processing to obtain an angular velocity data. The microprocessor 201 pre-stores a preset parameters table about the user's head motion events corresponding control actions in the memory 205. The MEMS angular velocity sensor 202 detects the user's head motion events and notifies the microprocessor 201 to receive the angular velocity data, and the microprocessor 201 determines which direction of motion or preset action event occurred according to a motional characteristic, and encodes the user's head motion events into key values of a standard input device (including a mouse and a keyboard), the displacement calculated according to an angular velocity is encoded as an axis code, and then package the encoded data according to a user interface protocol (including a Human Interface Device protocol). Finally, data packages are sent to the controlled electronic device through the wireless or wired connectivity 203. The electronic device (host) 210 is coupled to the HID by wireless or wired pairing and configured to receive the command from the HID and to perform an action based on the command.

The electronic device (host) 210 can be an electronic device or a computer (e.g.: cell phone, pad, PDA, e-book, PC, Notebook, Projector, radio, set top box, game device, etc.).

Figure 3:
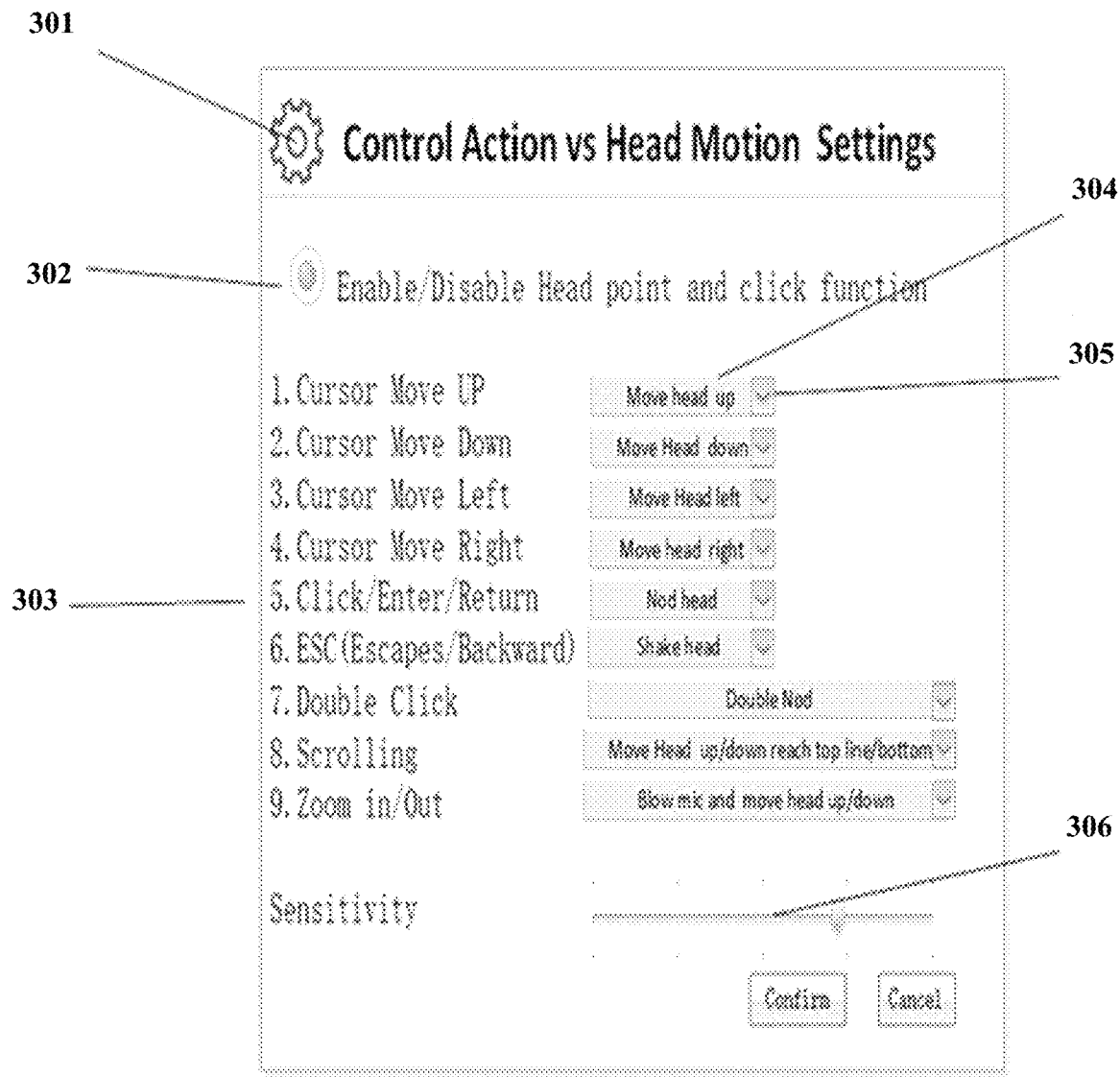
FIG. 3 is an embodiment of the presetting user interface in the present invention, in which the control and setting interface defines the preset parameters table about head motion event corresponding control action.

Further, FIG. 2 and FIG. 3 are used to illustrate the motion signal processing flow of the present invention. The MEMS angular velocity sensor 202 detects the direction and amplitude of the head rotation, obtains the angular velocity and transmits it to the microprocessor 201. The microprocessor 201 calculates, recognizes and judges that the head has occurred which direction of motion or preset action event. In other words, the MEMS angular velocity sensor 202 is mounted in a position that the y-axis of the MEMS angular velocity sensor 202 is parallel to the yaw axis of the user's head rotation, the z-axis is parallel to the pitch axis of the user's head rotation, the x-axis is parallel to the roll axis of the user's head, so as to detect and recognize the user's head rotation (including a moving direction, a displacement and a nodding/shaking head action) following a direction of eye watching. A high-pass filter built in the MEMS angular velocity sensor filters out a low-frequency static noise after a debounce processing to obtain an angular velocity data, and transfer to the microprocessor 201. And according to the preset head motion corresponding control action table including reference numbers 303, 304, 305, the received action events are encoded into key values or axis code of the standard input device, and are packed according to the human input interface protocol (such as HID protocol) and transmitted to the host 210 via the wireless or wired connectivity 203. After the host 210 receives the data, it is decoded by the input device driver and converted into a standard input event, and the input event stream is added until it is dispatched by the software to the corresponding display window. Thus, the head motion input event and the UI output display cooperate each other to complete human-machine interaction.

Please refer to FIG. 2 to illustrate the flow of processing the voice input signal of the present invention: the microphone 209 picks up analog audio signal, and the analog audio signal is sent to the audio codec 207 for A/D conversion to get the digital audio signal. The digital audio signal is processed by the microprocessor 201 and is temporarily stored as an audio stream (Media Flow) in the memory 205. It is sent to the wireless or wired connectivity 203 and then transmitted to the host 210.

Please refer to FIG. 2 to explain the earphone sound output signal or prompt sound processing flow: after the HID headset is paired with the host 210 (for example: Bluetooth Pairing), the host will consider the HID earphone set as a standard HID input device and standard audio input and output device. As long as the host is set the audio path from the earphone, all output sounds (such as voice menus, prompts, music, call sounds, ringtones, etc.) from the host are transmitted to the wireless or wired connectivity 203. After being decoded by the microprocessor 201 and temporarily stored in the memory 205, it is sent to the audio codec 207 for the A/D converter as an analog signal and is amplified with power amplification in the audio codec 207. The earpiece 208 is driven to make a sound.

Refer to FIG. 3 to explain the control action definition and settings corresponding to user's head motion event of the present invention, as shown in the figure, this setup program is generally run in a computer or a host such as the electronic device 101, and the setup parameters are transferred to the earphone via USB interface 211. After the head movement recognition, the earphone 103 outputs codes corresponding to various detected head motion events 304. The codes are generally key values/axis codes of a standard input device, for example: turning head up corresponds to the key value of the cursor key moving up; nodding corresponds to the key value of the ENTER key; shaking head corresponds to the key value of the Backspace/Escapes key. In addition, you can also enable/disable the head point-and-click function 302; and pull the slider 306 to adjust the angular velocity threshold to adjust the detection sensitivity. 305 is the pull down menu of the head motion event 304. There are two options, one is NONE, which means no setting, another is a preset value.

Figure 4A:
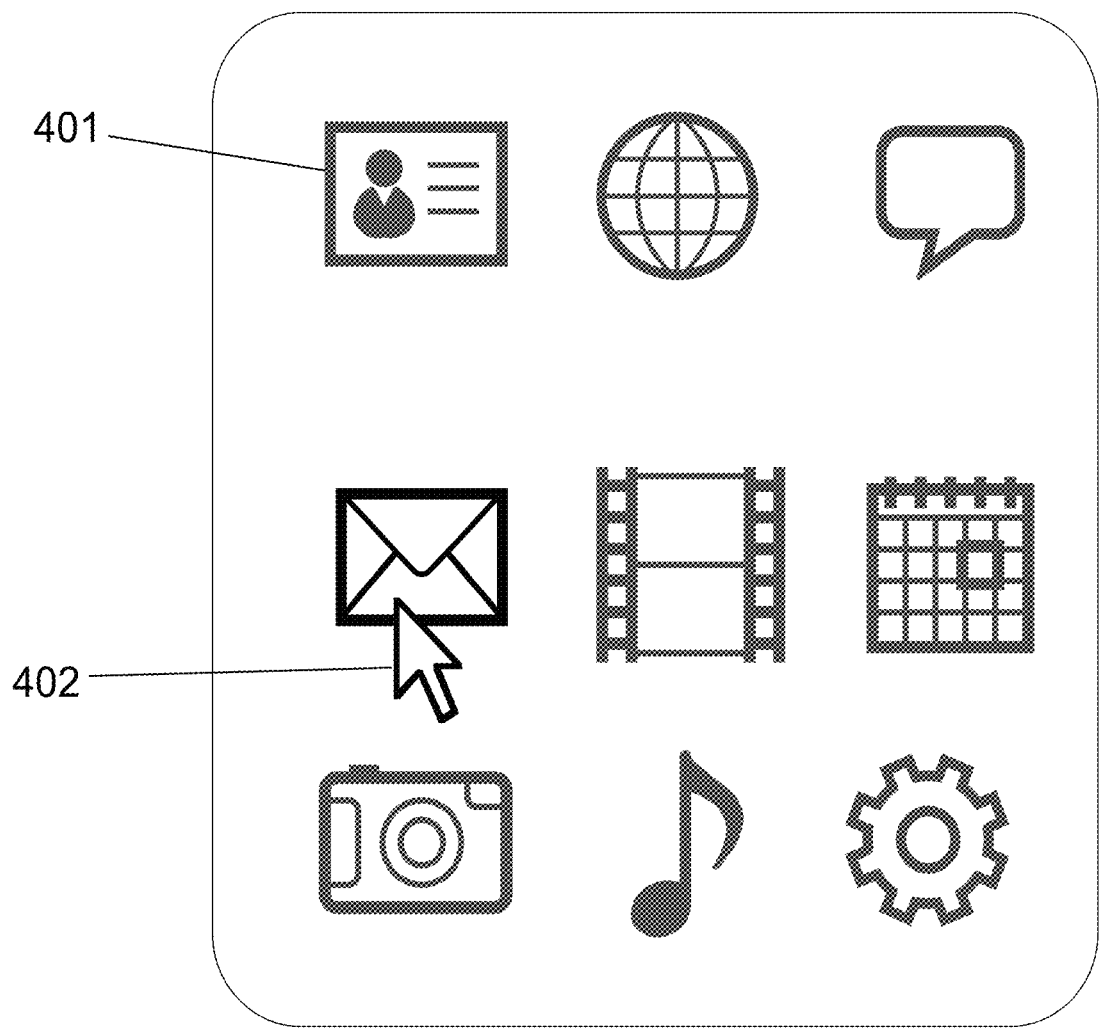
FIG. 4A is an embodiment of operating full graphic icon menu.
Figure 4B:
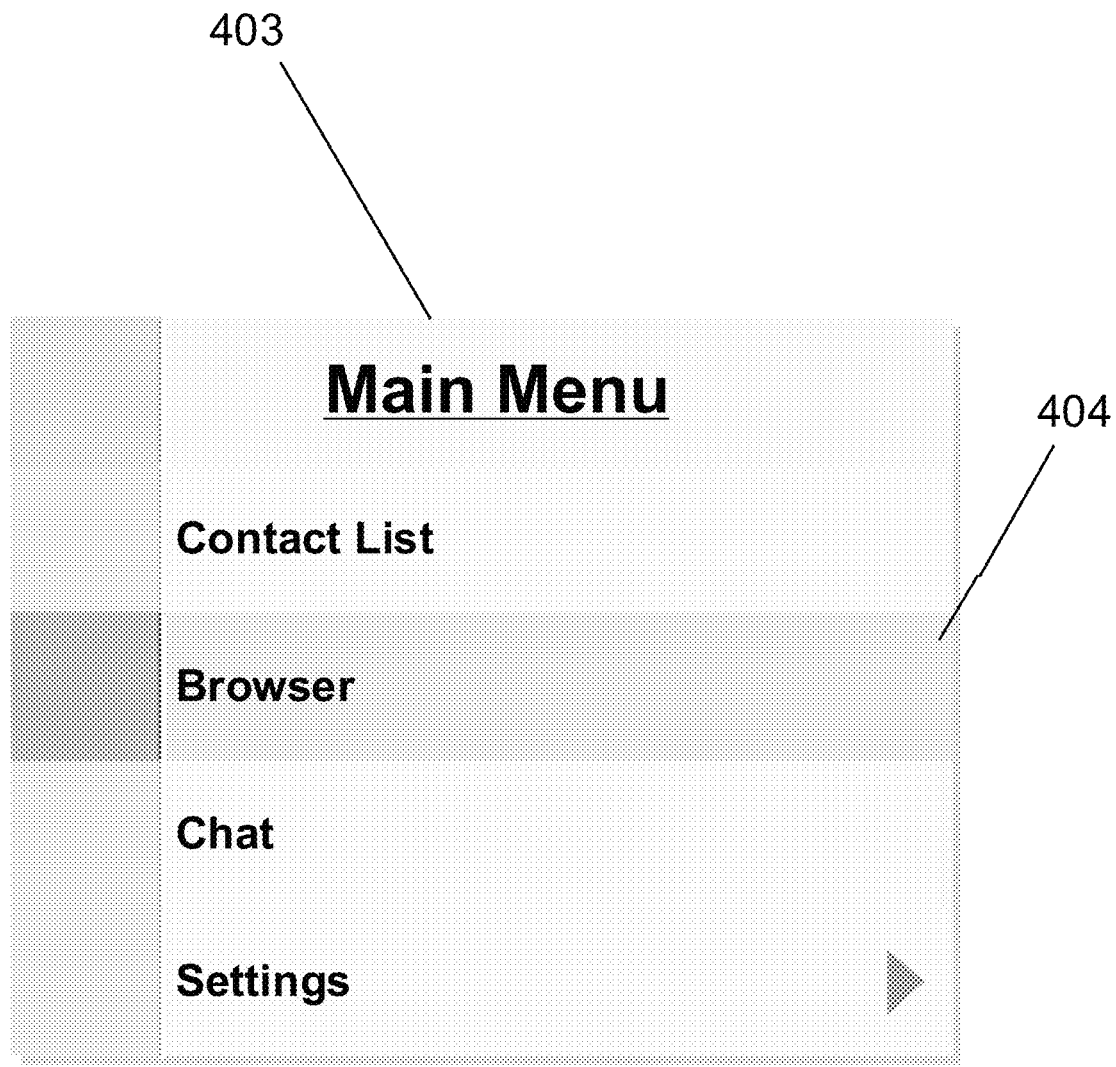
FIG. 4B is an embodiment of operating simple menu.

Please refer to FIG. 4A and FIG. 4B for an example of controlling the UI menu with Head Point-and-Click of the present invention. FIG. 4A is an example of controlling a full graphical icon user interface menu, such as Smart Phone. FIG. 4B is an example of controlling a text menu of an electronic device that uses a simple black and white screen of the present invention. The screen shown an icon of each APP 401 and a cursor 402. When the head moves with the direction of eye gaze, the cursor 402 also follows. When moving to the icon of the APP 401 (Application Program) to be entered, nod your head (equivalent to CLICK) to open the APP 401, shake your head to exit APP 401. Similarly, for a simple electronic device with black/white screen (FIG. 4B), when the user's head moves up and down, the highlight bar 404 also moves up and down, nodded (equivalent to CLICK) to enter this menu item, shake user's head to exit to return to the main menu 403.

Figure 5:
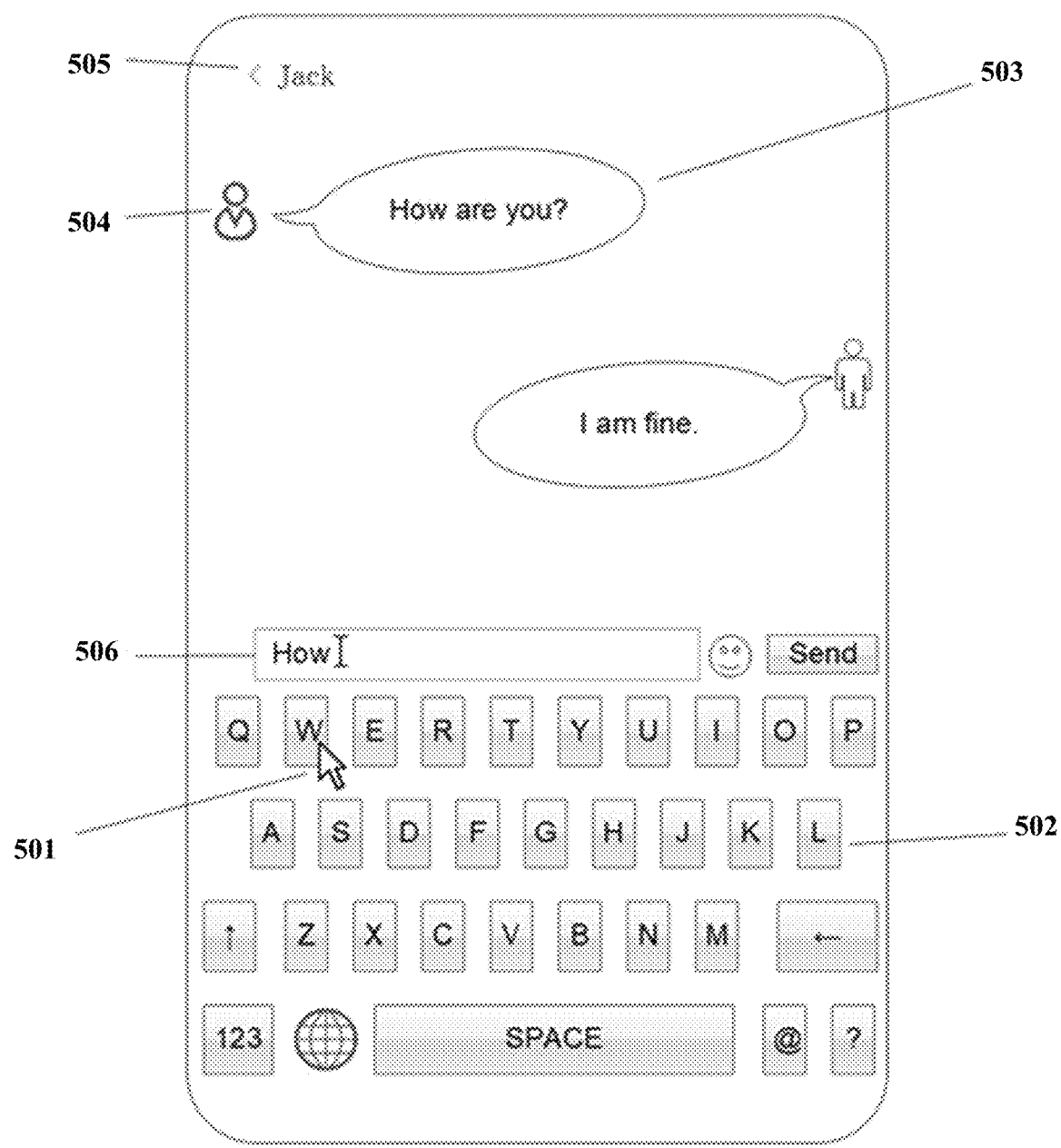
FIG. 5 is an embodiment of inputting information by user's head point-and-click in the present invention.

FIG. 5 shows an example of inputting information with head Point-and-Click of the present invention. Take a social media chat APP as an example, to input information, move the cursor 501 to the input box 506 by moving the head and then nod for clicking to pop up a virtual keyboard 502, move the cursor 501 to the letter key you want to enter, nod your input, move the cursor to the SEND key and nod to send the message. 505 is a CHAT user name, 504 is an identification of another user chatting with the user of the CHAT user name 505, and 503 is a chat content.

Figure 6:
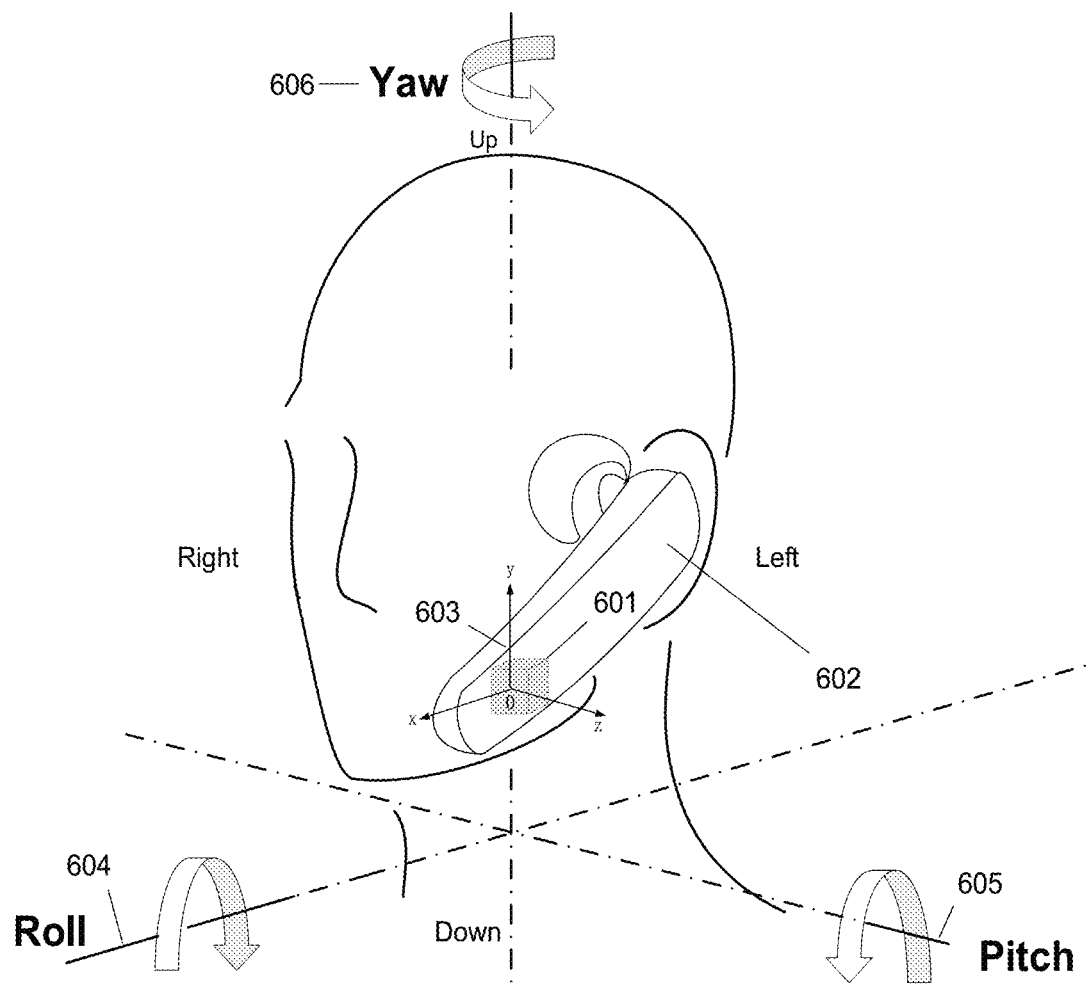
FIG. 6 illustrates the mounting position of the angular velocity sensor in the earphone, the coordinate system used and the direction of rotation of the head movement in 3D space in the present invention.

Please refer to FIG. 6 to explain the coordinate system used by the angular velocity sensor 601 installed in the earphone and the direction of head movement in 3D space of the present invention. As shown in the figure, the head movement cannot be moved freely due to the neck limitation, so the head movement is not translation rather the rotation around the neck and the rotation angle does not exceed +/−180 degrees. When the user turns head left or right or shakes the head, it rotates around the yaw axis 606, and when the user lifts head up or puts head down or nods, it rotates around the pitch axis 605. The angular velocity sensor 601 is mounted just in the position that the y-axis of the sensor is parallel to the yaw axis 606 of the head rotation, the z-axis is parallel to the pitch axis 605 of the head rotation, the x-axis is parallel to the roll axis 604 of the head rotation, which allows the head rotates around the z-axis when moving up or down or nodding, and rotates around y-axis when moving left or right or shaking. The head's motion can be identified according to this motional characteristic.

As shown in the figure, the angular velocity sensor 601 is a digital three-axis angular velocity sensor, for example: ST company's L3GD20H, the size is only 3×3×1 mm, which is different from the ancient analog angular velocity sensor that outputs analog signals, it can directly output the angular velocity value because the analog signal has been converted into a digital signal by the built-in ADC.

The angular velocity sensor can report the angular velocity along three coordinate axes, with positive and negative signs, a positive value indicates rotation in counterclockwise, a negative value indicates rotation in clockwise, and the direction of the angular velocity is obtained by the right-hand-thread rule.

In addition, the angular velocity sensor has a built-in high-pass filter and a low-pass filter, which makes it easy to delete the DC component of the measured angular rate, which means removing some noise interference.

Angular velocity sensor usually also provides an interrupt function, that is, detecting that the angular velocity value is greater than or less than the set threshold will trigger the interruption and handle the event by microprocessor 201. In the angular velocity sensor 601 interrupt register, you can set which axis value is greater or less this threshold (this threshold can be adjusted by the slider 306 of FIG. 3), or you can combine the axes you want to detect. The interrupt register can also define DURATION to define the detection time, when this time is reached and the threshold is exceeded, an interrupt can be triggered; a practical Movement and Wake-up interrupt is also provided for power management, that is, if the earphone is not rotating, the earphone is in a power-saving sleep state, and only enters the normal working mode when the earphone is rotated.

Figure 7A:
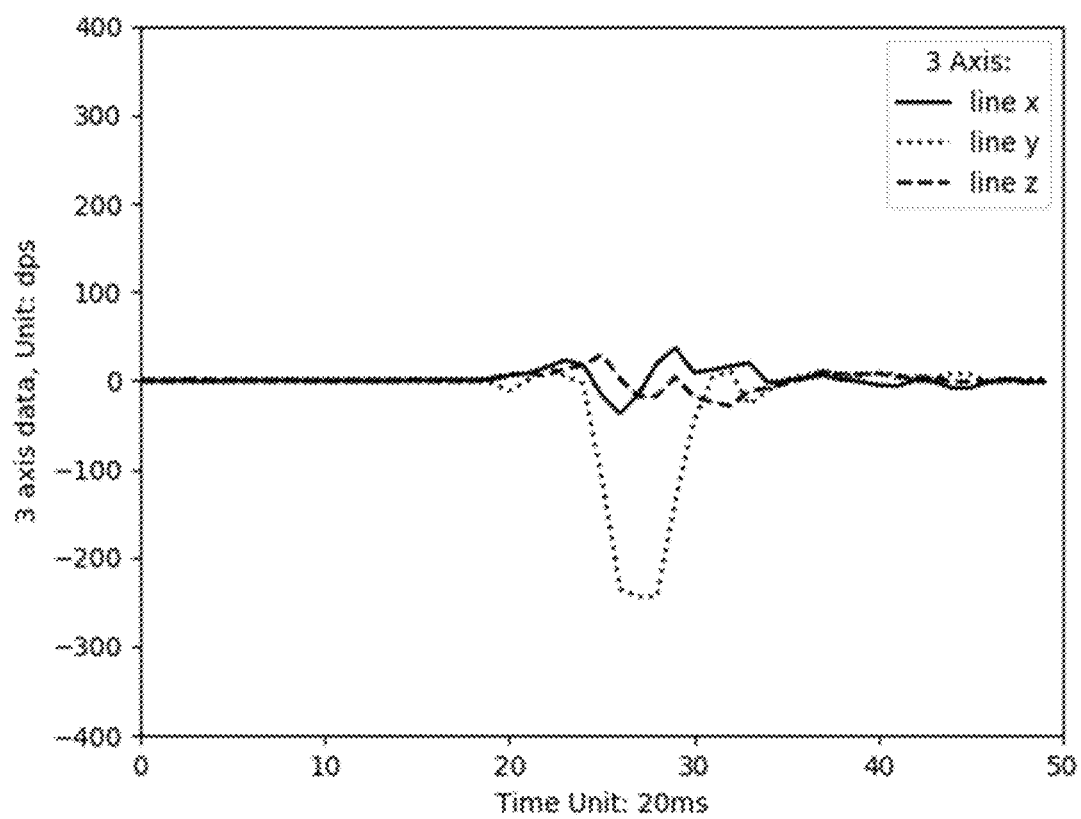
FIG. 7A is the measured angular velocity versus time curve of the three axes in case of turning the head left in the present invention.

Continue to refer to FIG. 6 and FIG. 7A to FIG. 7G, which explain the implementation method of Head Point-and-click of the present invention, that is, detecting and identifying the direction of head movement to point, and detecting the nod action to click. To achieve pointing, the direction of head movement is detected and the distance of the movement is measured so that the cursor can be controlled according to these two parameters. FIG. 7A is the measured angular velocity versus time curve of the three axes in case of turning the head left.

From FIG. 6, we know that, when turn head left or right or shakes the head, it rotates around the yaw axis 606 while there is no rotation around pitch and roll axis. So, the characteristic of user's head turning left is that the measured angular velocity of the y-axis is positive (indicating rotating in counterclockwise direction), and the measured angular velocity of the x-axis and z-axis is kept constant basically. The identification method is that: if the measured angular velocity of the y-axis in a certain duration exceeds a certain threshold value and the polarity is positive, and the angular velocity of the x and z-axis changes little, the movement of the head to the left is considered to have occurred; written as an expression:

$Ay>0$ & $Ay>$|threshold| & $Ax<$|threshold$_{min}$|& $Az<$|threshold$_{min}$|(where $Ax$, $Ay$ and $Az$ represent the angular velocity of $x$, $y$ and $z$ axes respectively)

Figure 7B:
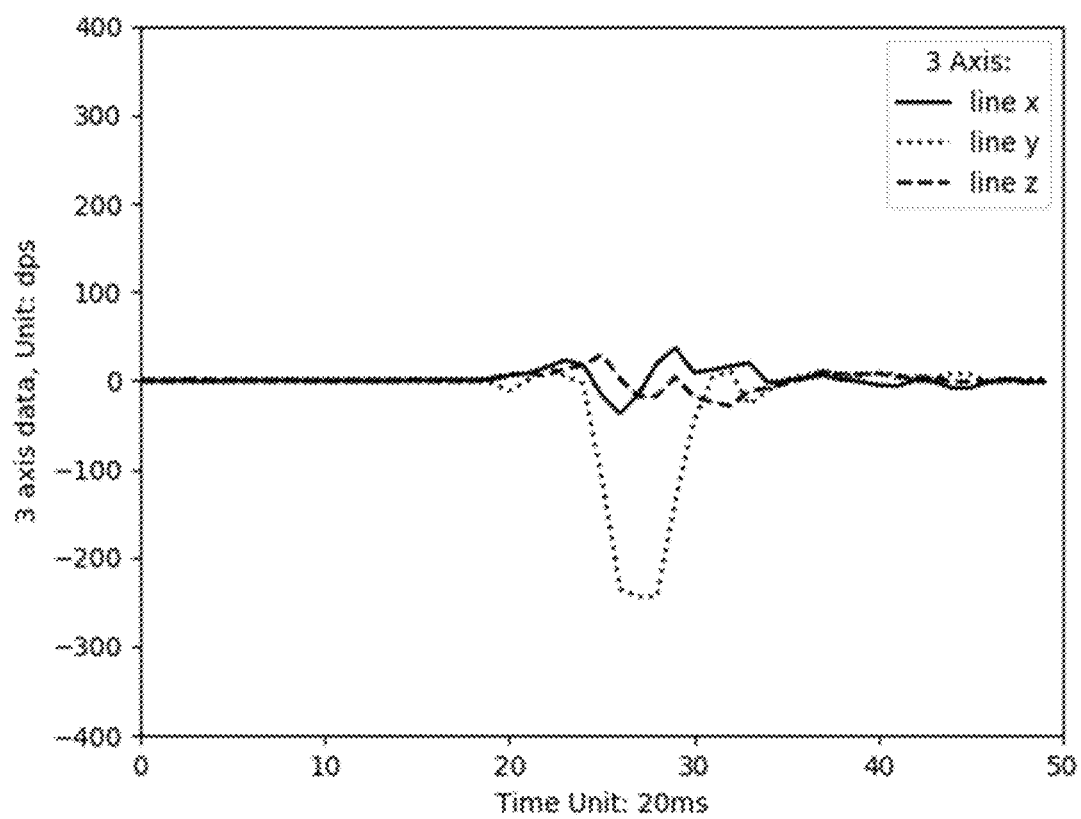
FIG. 7B is the measured angular velocity versus time curve of the three axes in case of turning the head right in the present invention.

FIG. 7B is the measured angular velocity versus time curve of the three axes in case of turning the head right. The characteristic of head turning right is that the measured angular velocity of the y-axis is negative (indicating rotating in clockwise direction), and the measured angular velocity of the x-axis and z-axis is kept constant basically. If the measured angular velocity of the y-axis in a certain duration exceeds a certain threshold value and the polarity is negative, and the angular velocity of the x and z-axis changes little, the movement of the head to the right is considered to have occurred; written as an expression:

$Ay<0$ & $Ay>$|threshold|& $Ax<$|threshold$_{min}$|& $Az<$|threshold$_{min}$|(where $Ax$, $Ay$ and $Az$ represent the angular velocity of $x$, $y$ and $z$ axes respectively)

Figure 7C:
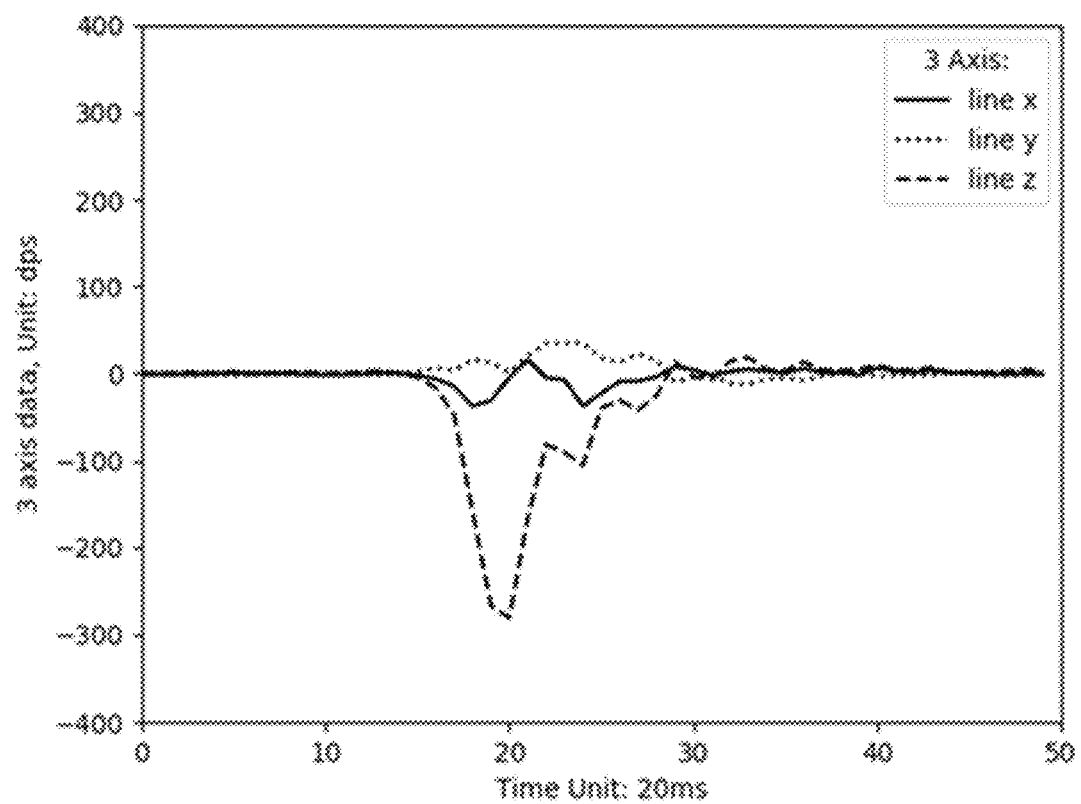
FIG. 7C is the measured angular velocity versus time curve of the three axes in case of turning head up in the present invention.

FIG. 7C is the measured angular velocity versus time curve of the three axes in case of turning head up. From FIG. 6, we know that, when head up or down or nods, it rotates around the pitch axis 605 while there is no rotation around yaw and roll axis. The characteristic of head up is that the measured angular velocity of the z-axis is negative (indicating rotating in clockwise direction), and the measured angular velocity of the x-axis and y-axis is kept constant basically. If the measured angular velocity of the z-axis in a certain duration exceeds a certain threshold value and the polarity is negative, and the angular velocity of the x and y-axis changes little, the movement of the head up is considered to have occurred; written as an expression:

$Az<0$ & $Az>$|threshold|& $Ax<$threshold$_{min}$|& $Ay<$|threshold$_{min}$|(where $Ax$, $Ay$ and $Az$ represent the angular velocity of $x$, $y$ and $z$ axes respectively)

Figure 7D:
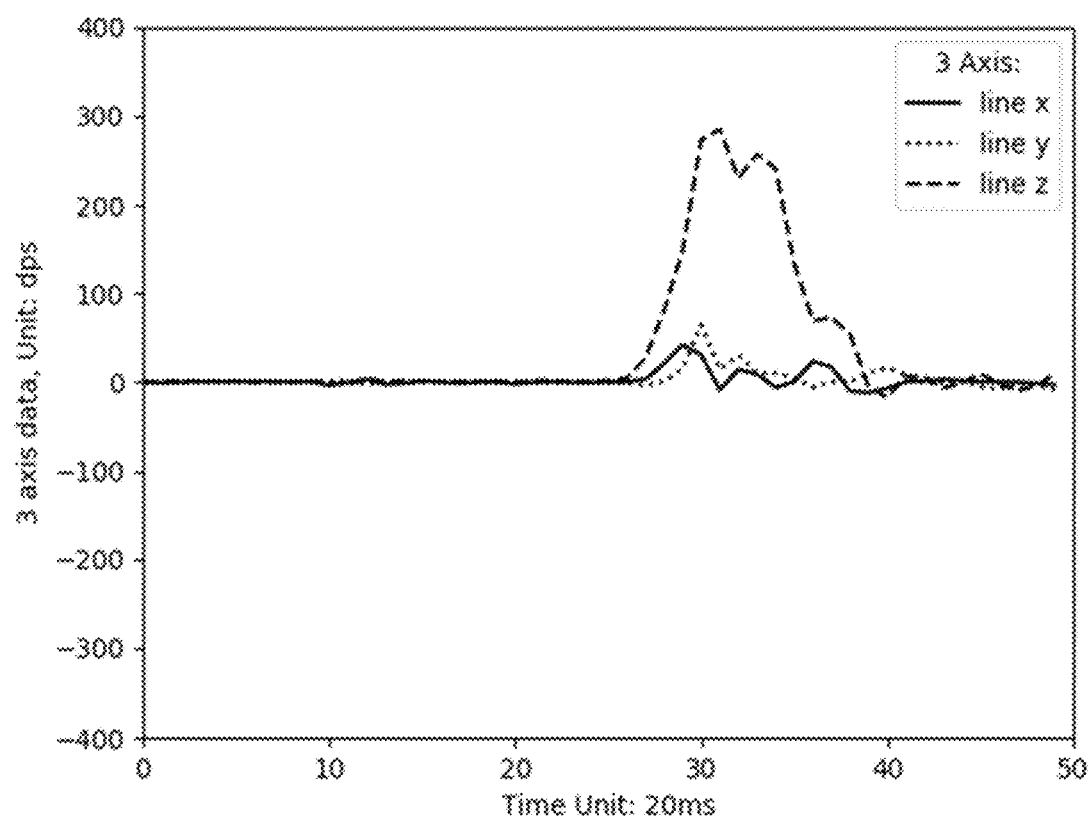
FIG. 7D is the measured angular velocity versus time curve of the three axes in case of turning head down in the present invention.

FIG. 7D is the measured angular velocity versus time curve of the three axes in case of turning head down. From FIG. 6, we know that, when head up or down or nods, it rotates around the pitch axis 605 while there is no rotation around yaw and roll axis. The characteristic of head down is that the measured angular velocity of the z-axis is positive (indicating rotating in counterclockwise direction), and the measured angular velocity of the x-axis and y-axis is kept constant basically. If the measured angular velocity of the z-axis in a certain duration exceeds a certain threshold value and the polarity is positive, and the angular velocity of the x and y-axis changes little, the movement of the head down is considered to have occurred; written as an expression:

$Az<0$ & $Az>$|threshold|& $Ax<$threshold$_{min}$|& $Ay<$|threshold$_{min}$|(where $Ax$, $Ay$ and $Az$ represent the angular velocity of $x$, $y$ and $z$ axes respectively)

As shown in FIG. 7A to FIG. 7D, the direction of movement can now be detected. It is also necessary to detect the displacement of the movement to determine the distance that the cursor will move in the direction of movement. Since the head moves with the neck as the axis of rotation (see FIG. 6), the distance of movement is the radian of the head's rotation, which can be obtained by integrating the measured angular velocity, multiplying it by a factor k can get the distance of the cursor movement, so that the distance of the cursor movement is proportional to the amplitude of rotation.

Because the definition of angular velocity is:

$\therefore A = d\theta/dt$ ($\theta$ is the radian traversed, $t$ is time, $A$ is Angular velocity, unit is rad/s)

$\therefore \theta = \int_{t_0}^{t_m} A dt$ (Before each integration, pay attention to high-pass filtering, otherwise integration will accumulate a very large drift error due to the influence of DC and very low frequency components)

Calculating the integral is to find the area from the $A_{(t)}$ curve to the time axis $t_0$-$t_n$. Due to power consumption and cost considerations, it is impossible for the microprocessor 201 of the earphone to use a powerful floating-point processor. It is difficult for the microprocessor 201 to calculate the integral, so the area of curve can be approximated by the area of trapezoid instead.

Figure 7E:
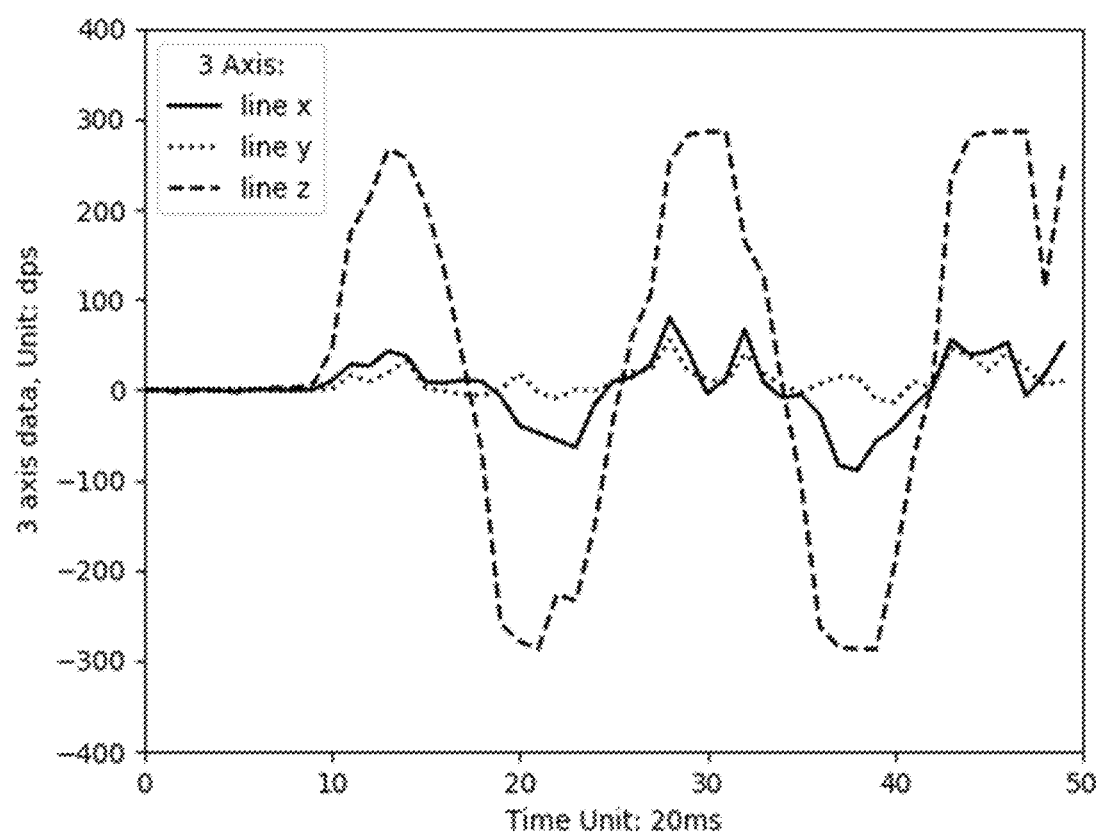
FIG. 7E is the measured angular velocity versus time curve of the three axes in case of nodding head (turn head quickly from up to bottom) in the present invention.
Figure 7F:
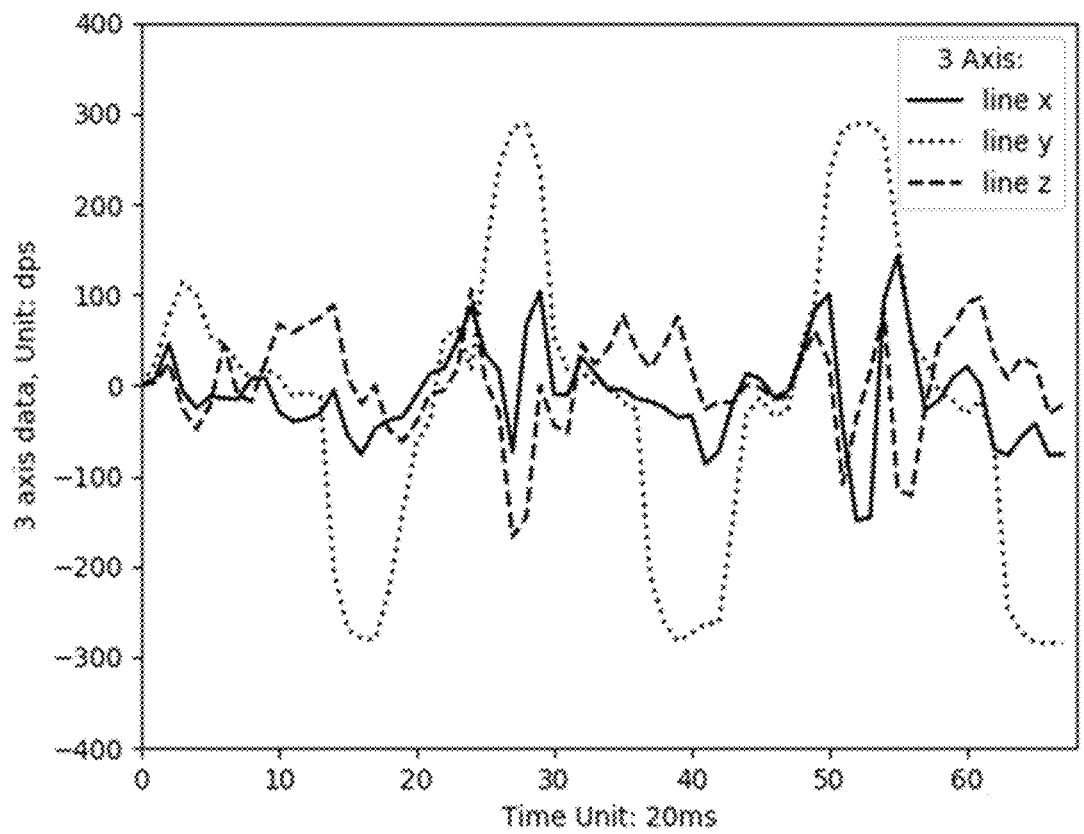
FIG. 7F is the measured angular velocity versus time curve of the three axes in case of shaking head (turn head quickly from left to right) in the present invention.
Figure 7G:
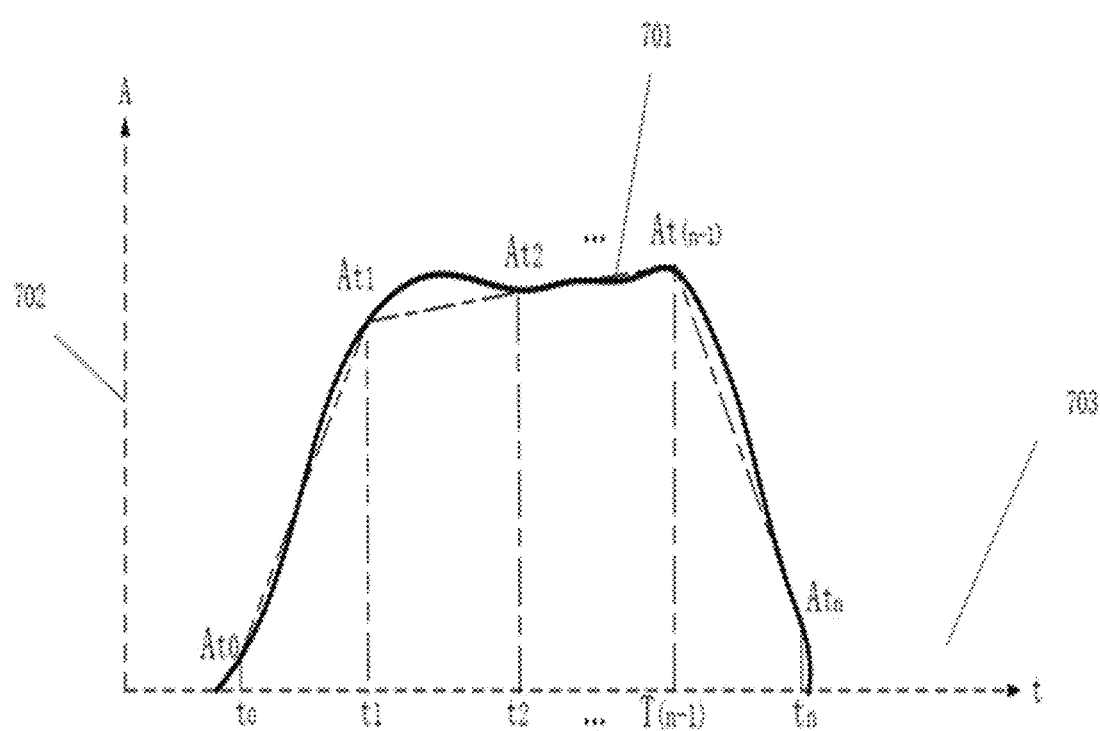
FIG. 7G shows how to use the trapezoidal area method to calculate the integral of the angular velocity to obtain the rotation angle (movement displacement) in the present invention.

FIG. 7G shows how to use the trapezoidal area method to calculate the integral of the angular velocity to obtain the rotation angle (movement displacement). As shown in the figure, the y axis 702 is the angular velocity A, and the $A_{(t)}$ curve 701 can be replaced by a section of polyline $A_{t0}$ $A_{t1}$ ... $A_{t(n-1)}$ $A_{tn}$, and the sum of the trapezoidal areas $SA_{t0}$ $A_{t1}t_1t_0 + SA_{t1} A_{t2}t_2t_1 + \ldots + SA_{t(n-1)} A_m t_n t_{(n-1)}$ to represent the area enclosed by the curve and the time axis 703, written as an expression is:

$$\theta = \int_{t_0}^{m} A dt \approx SA_{t0} A_{t1}t_1t_0 + SA_{t1} A_{t2}t_2t_1 + \ldots + SA_{t(n-1)}$$
$$A_m t_n t_{(n-1)} = [(A_{t0}+A_{t1})/2 * (t_1-t_0)] + [(A_{t1}+A_{t2})/2 *$$
$$(t_2-t_1)] + \ldots + [(A_{m-1}+A_m)/2 * (t_n-t_{n-1})] \text{ (According to the formula of trapezoidal area} = \text{(long polyline } A_{t(n-1)}t_{n-1} + \text{short polyline } A_m tn)/2 * (t_n-t_{n-1}))$$

Because of the equivalent time sampling angular velocity, $$\therefore (t_n - t_{n-1}) = \ldots = (t_2 - t_1) = (t_1 - t_0) = \Delta t, \text{ then}$$

$$\therefore \theta = [(A_{t0}+A_{t1})/2 + (A_{t1}+A_{t2})/2 + \ldots + (A_{t(n-1)}+A_m)/2]$$
$$* \Delta t = [(A_{t0}+A_m)/2 + (A_{t1}+A_{t2}+ \ldots +A_{t(n-1)}] * \Delta t$$

The above equation is much easier to calculate with the software program than the integral, the sampled data is accumulated and multiplied by the sampling interval, so it can be achieved without using a powerful CPU.

FIG. 7E is the measured angular velocity versus time curve of the three axes in case of nodding head (turn head quickly from up to bottom). From FIG. 6, we know that, when heading up or down or nodding, it rotates around the pitch axis 605 while there is no rotation around yaw and roll axis. The characteristic of the nodding action is that the measured angular velocity of the z-axis alternates between positive and negative, and the measured angular velocity of the x-axis and y-axis is kept constant basically. If the measured angular velocity of the z-axis in a certain duration exceeds a certain threshold value and the polarity alternates between positive and negative, and the angular velocity of the x and y-axis changes little, the movement of the nodding is considered to have occurred; written as an expression:

$|Az|$>threshold &
$Ax$<|threshold$_{min}$|=&$Ay$<|threshold$_{min}$|(where $Ax$, $Ay$ and $Az$ represent the angular velocity of $x$, $y$ and $z$ axes respectively)

FIG. 7F is the measured angular velocity versus time curve of the three axes in case of shaking head (turning head quickly from left to right). From FIG. 6, we know that, when turning head left or right or shaking the head, it rotates around the yaw axis 606 while there is no rotation around pitch and roll axis.

The characteristic of the shaking action is that the measured angular velocity of the y-axis alternates between positive and negative, and the measured angular velocity of the x-axis and z-axis is kept constant basically. If the measured angular velocity of the y-axis in a certain duration exceeds a certain threshold value and the polarity alternates between positive and negative, and the angular velocity of the x and z-axis changes little, the movement of the shaking head is considered to have occurred. It is written as an expression: $|Ay|$>threshold & $Ax$<|threshold$_{min}$|=&$Az$<|threshold$_{min}$|(where $Ax$, $Ay$ and $Az$ represent the angular velocity of $x$, $y$ and $z$ axes respectively)

Use FIG. 2 to explain the voice input recognition process for getting the control combination with the head motion input, making using of the microphone 209 and audio codec 207 existing in the earphone, and the memory connected to the microprocessor 201, the microphone 209 picks up analog audio signal, and sent to the audio codec 207 for A/D conversion, If the measured sound amplitude in a certain duration exceeds a certain threshold value and the sound input event is considered to have occurred, thus, more control is obtained by the combination of sound input and the head motion input.

Figure 8:
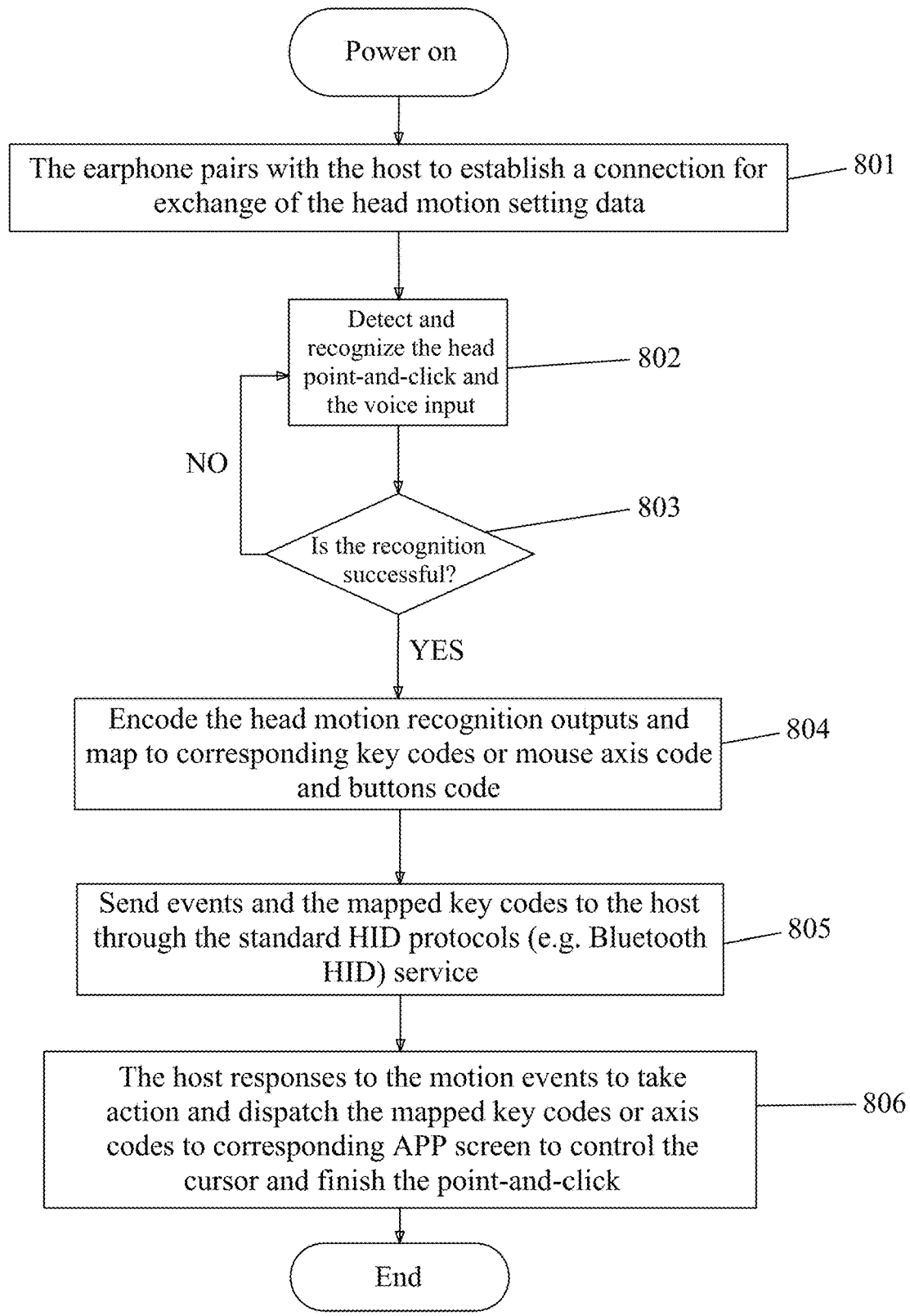
FIG. 8 shows the entire software operation flow from recognizing the rotation of head to complete human-machine interaction.

To summary, you can understand the entire software processing flow of the present invention including the method, system and apparatus from recognizing the rotation of head to complete human-machine interaction through FIG. 8. In FIG. 8, the entire processing flow of the present invention includes several steps 801-806. In step 801, the earphone pairs with the host to establish a connection for exchange of the head motion setting data. In step 802, detect and recognize the head point-and-click and the voice input. In step 803, is the recognition successful? In step 804, encode the head motion recognition outputs and map to corresponding key codes or mouse axis code and buttons code. In step 805, send events and the mapped key codes to the host through the standard HID protocols (e.g. Bluetooth HID) service. In step 806, the host responses to the motion events to take action and dispatch the mapped key codes or axis codes to corresponding APP screen to control the cursor and finish the point-and-click.

In details, after power on the HID earphone and the host, both are paired to establish a host-slave (or master-slave) connection relationship (step 801), the host (or master) and slave devices exchange setting parameters each other. The host (or master) is the electronic device or computer to be controlled and the HID earphone is a slave device.

The microprocessor 201 controls the digital triaxial MEMS angular velocity sensor 202 to detect the head movement direction and displacement or action (step 802), and enable the high-pass filter in the MEMS angular velocity sensor 202 to filter out low-frequency static noises and obtain the angular velocity, is send to the microprocessor 201 for debounce processing and recognition, according to the characteristic of head rotation described in FIG. 7A-FIG. 7G, determine which direction the pointing has occurred and calculate the movement displacement, or identify nodding or shaking head action, in accordance with the preset control definition (FIG. 3) corresponding to the head movement, the received motion event is encoded, which is generally encoded as the axis code and mouse buttons key values corresponding to the standard input device.

For example: the left and right movement of the head and the displacement are mapped to the x-axis code of the Android standard mouse device: +/−d, which is used to report the displacement of the cursor along the x-axis, where d means displacement, where "+" means moving to the right, and "−" means moving to the left; The up and down movement of the head and the displacement are mapped to the y-axis code of the standard pointer device: +/−d, which is used to report the displacement of the cursor along the y-axis d displacement, where "+" represents upward movement, "−" represents downward moving; the nodding action event is mapped to the mouse LEFT buttons.

It can also be mapped to the key values. For example: the head moves up/down/left/right is mapped to the corresponding keyboard up/down/left/right direction keys, the displacement of the movement is mapped to the number of times the direction key is pressed, nodding head event is mapped to the ENTER key value, and shaking head is mapped to Backspace/ESC.

After encoding (step 804), the data is packed according to the human-machine input interface protocol (such as HID protocol) (step 805), and then transmitted to the host 210 through the wireless or wired connectivity 203, the HID driver of the HOST software receives data, unpacks and decodes the data and is converted into standard input events, and joins the input event stream until it is dispatched to the corresponding output display window to perform the corresponding action (step 806), feedback execution results on the screen.

In this way, the head rotation input event and the UI output display cooperate to complete the human-machine interaction.

In summary, the present invention has the following advantages:

1. Make the earphone not only an AUDIO IN/OUT device, but also an user input and user output device for HID (Human Interface Device). The user input can be Head point-and-click, or voice input, or even voiceprint input as access authorization; AUDIO OUT of the earphone becomes a human-machine interaction user output device, outputting sound prompts, and even a sound menu for user input selection.

2. Human-machine interaction generally consists of two devices, one as user input and one as user output. The present invention combines two devices into one, and integrates two user inputs (motion detection input, voice input) and user output (voice output) in one.

3. The operation of the invention is natural (for example, where you are watching is where the cursor will point), it does not occupy much space when used, and it can free your hands to do other things, suitable for specific groups of persons (such as drivers, disabled peoples, workers using tools, firemen, Polices, etc.), especially useful for people who are not convenient to free their hands to operate the machine.

4. The head movement cannot be moved freely due to the neck limitation, so the head movement is not translation rather the rotation around the neck and the rotation angle does not exceed +/−180 degrees, therefore, the angular velocity sensor which is good for measuring rotational motion is more suitable than accelerometer which is good for detecting linear motion, identification with angular velocity sensor is more simpler and easily.

5. Compared with head gesture recognition based on optics (such as camera, optical emitters and photo transistor, infrared, TOF etc.), head point-and-click recognition based on angular velocity sensor has the advantages of small size, low power consumption and low cost.

6. More control is obtained by the combination of sound input and the head motion input.

7. With wireless remote operation capabilities, especially suitable for large screen presentation, such as electronic blackboards or projectors, it is no longer necessary to sit on the table and move the mouse, or wave the laser pointer without occupying too much space for operation, and there is no need to leave a 2D surface plane space for MOUSE movement. It can be used in free 3D space. Achieve the convenience of operation.

8. Instead of eyeglasses or other wearable devices, an earphone is selected as a carrier, it not only can track the movement of the head in the direction of the eye's sight, but also reduce the foreign body sensation and consider that those who wear eyeglasses can no longer wear more glasses. Another reason is that you can do more controlling combination with the earphone microphone sound input and the user's head movement.

The above-mentioned embodiments and implementation manners are only used to illustrate the preferred embodiments or implementations of the technology of the present invention, and do not limit the implementation of the technology of the present invention in any form, any person skilled in the art can make some changes or modifications to other equivalent embodiments without departing from the scope of the technical means disclosed in the content of this invention, but it should still be regarded as substantially the same technology or implementation as this invention example.

What is claimed is:

1. A human-machine interaction method enabling a user to interact with an electronic device by turning a user's head to provide the mouse's point-and-click functionality, the mouse's point-and-click functionality obtained by identifying a movement of the user's head according to a motional characteristic, a pointing obtained by detecting a movement of the user's head to left/right/up/down, a clicking obtained by nodding the user's head, the human-machine interaction method including:

choosing a carrier which follows the user's head rotation and establishing a master-slave connection with an electronic device through a wireless or wired pairing;

tracking and detecting the user's head rotation, and obtaining user's head motion events, the user's head motion events at least including a moving direction, a displacement and a nodding/shaking head action;

encoding the user's head motion events into corresponding control commands;

configuring a control action based on an identified characteristic of the user's head motion;

sending the control commands to the electronic device by a wireless or wired connectivity; and receiving the control commands by the electronic device, the electronic device performing an action based on the control commands, wherein the control action is configured to determine the moving direction of a cursor, the displacement and the clicking action on the electronic device, under the cooperation of a user output interface, to complete the human-machine interaction;

wherein the carrier is an earphone equipped with a MEMS 3-axis angular velocity sensor, which detects and recognizes the movement (including the moving direction, the displacement and the nodding/shaking head action) of the user's head following a direction of eye watching, a high-pass filter built in the MEMS angular velocity sensor filters out a low-frequency static noise to obtain an angular velocity data;

the method further comprising making using of a microphone and an audio codec existing in the carrier (earphone), and a memory connected to a microprocessor, the microphone picks up analog audio signal, and sends the analog audio signal to the audio codec for A/D conversion, if a measured sound amplitude in a certain duration exceeds a certain threshold value and a sound input event is considered to have occurred, thus, more control is obtained by the combination of a sound input and a head motion input so that the user whistles and lifts head up to zoom in a picture, whistles and puts head down to zoom out the picture.

2. The method of claim 1, wherein the user's head motion is identified according to the motional characteristic, based on a MEMS 3-axis angular velocity sensor is mounted in a position that a y-axis of the MEMS 3-axis angular velocity sensor is parallel to a yaw axis of the user's head rotation, a z-axis of the MEMS 3-axis angular velocity sensor is parallel to a pitch axis of the user's head rotation, an x-axis of the MEMS 3-axis angular velocity sensor is parallel to a roll axis of the user's head rotation, the motional characteristic for the user's head turning left is that a measured angular velocity of the y-axis is positive (indicating rotating in counterclockwise direction), and the measured angular velocity of the x-axis and the z-axis is kept constant basically, an identification method is that: if the measured angular velocity of the y-axis in a certain duration exceeds a certain threshold value and a polarity thereof is positive, and the angular velocity of the x-axis and the z-axis changes little, the movement of the user's head to the left is considered to have occurred;

similarly, the motional characteristic for the user's head turning right is that the measured angular velocity of the y-axis is negative (indicating rotating in clockwise direction), and the measured angular velocity of the x-axis and the z-axis is kept constant basically; if the measured angular velocity of the y-axis in a certain duration exceeds a certain threshold value and the polarity thereof is negative, and the angular velocity of the x-axis and the z-axis changes little, the movement of the user's head to the right is considered to have occurred;

similarly, the motional characteristic for the user's head up is that the measured angular velocity of the z-axis is negative (indicating rotating in clockwise direction), and the measured angular velocity of the x-axis and the y-axis is kept constant basically, if the measured angular velocity of the z-axis in a certain duration exceeds a certain threshold value and the polarity thereof is negative, and the angular velocity of the x-axis and the y-axis changes little, the movement of the user's head up is considered to have occurred;

similarly, the motional characteristic for the user's head down is that the measured angular velocity of the z-axis is positive (indicating rotating in counterclockwise direction), and the measured angular velocity of the x-axis and the y-axis is kept constant basically; if the measured angular velocity of the z-axis in a certain duration exceeds a certain threshold value and the polarity thereof is positive, and the angular velocity of the x-axis and the y-axis changes little, the movement of the user's head down is considered to have occurred;

similarly, the characteristic for the user's nodding action is that the measured angular velocity of the z-axis alternates between positive and negative, and the measured angular velocity of the x-axis and the y-axis is kept constant basically; if the measured angular velocity of the z-axis in a certain duration exceeds a certain threshold value and the polarity thereof alternates between positive and negative, and the angular velocity of the x-axis and the y-axis changes little, the movement of the user's nodding is considered to have occurred;

similarly, the motional characteristic for the user's shaking action is that the measured angular velocity of the y-axis alternates between positive and negative, and the measured angular velocity of the x-axis and the z-axis is kept constant basically; if the measured angular velocity of the y-axis in a certain duration exceeds a certain threshold value and the polarity thereof alternates between positive and negative, and the angular velocity of the x-axis and the z-axis changes little, the movement of the user's shaking head is considered to have occurred.

3. A human-machine interaction apparatus, paired with a controlled electronic device to establish a master-slave connection relationship, a carrier of the apparatus configured to be positioned at a user's head, following the user's head rotation, the apparatus comprising at least a MEMS 3-axis angular velocity sensor, a microprocessor, a memory and a wireless or wired connectivity, wherein the MEMS angular velocity sensor is mounted in a position that a y-axis of the MEMS angular velocity sensor is parallel to a yaw axis of the user's head rotation, a z-axis of the MEMS angular velocity sensor is parallel to a pitch axis of the user's head rotation, an x-axis of the MEMS angular velocity sensor is parallel to a roll axis of the user's head, so as to detect and recognize the user's head rotation (including a moving direction, a displacement and a nodding/shaking head action) following a direction of eye watching, a high-pass filter built in the MEMS angular velocity sensor filters out a low-frequency static noise to obtain an angular velocity data; the microprocessor pre-stores a preset parameters table about the user's head motion events corresponding control actions in the memory; the MEMS angular velocity sensor detects the user's head motion events and notifies the microprocessor to receive the angular velocity data, and the microprocessor determines which direction of motion or preset action event occurred according to a motional characteristic, and encodes the user's head motion events into key values of a standard input device (including a mouse and a keyboard), the displacement calculated according to an angular velocity is encoded as an axis code, and then packaged as data packages according to a user interface protocol (including a Human Interface Device protocol), finally, the data packages are sent to the controlled electronic device through the wireless or wired connectivity;

wherein the controlled electronic device has a user input device driver for unpacking and decoding each of the data packages and converting to standard input events, thus, a head rotation input event and an UI (User Interface) output cooperate to complete a human-machine interaction;

wherein the carrier adopts an earphone/headphone/earbud with HID (human interface device) function; wherein the controlled electronic device includes a cell phone, pad, PDA, e-book, PC, Notebook, Projectors, radios, set top boxes, pagers, game device;

wherein a microphone and an audio codec existing in the earphone are used, the microphone picks up analog audio signal, and sends the analog audio signal to the audio codec for A/D conversion;

wherein the microprocessor processes a digital sound data from the audio codec, wherein the microprocessor judges that a received sound amplitude is greater than a certain threshold within a certain duration, then a sound input event is considered to have occurred, thus, more control is obtained by a combination of a sound input and a head motion input, so that a user whistles and lifts head up to zoom in a picture, whistles and puts head down to zoom out the picture.

4. A human-machine interaction system comprising a human interface device (HID) and an electronic device, which establishes a host-slave relationship through a wireless or wired pairing, wherein the electronic device is a host device while the HID is a slave, the HID is configured to be positioned in a user's ear which follows a user's head motion, an angular velocity sensor is housed in the device, a microprocessor is coupled to the angular velocity sensor, the microprocessor is configured to receive a rotational motion data from the angular velocity sensor, so as to recognize a user's head motion characteristic and obtain user's head motion events, at least including a moving direction, a displacement and a nodding/shaking head action, and a control action is configured based on an identified characteristic of the user's head motion; the electronic device is coupled to the HID by the wireless or wired pairing and configured to receive a command from the HID and to perform an action based on the command;

wherein the HID comprises a carrier with a MEMS 3-axis angular velocity sensor, the microprocessor, a memory and a wireless or wired connectivity, the microprocessor pre-stores a preset parameters table about each of the user's head motion events corresponding control actions in the memory; the MEMS angular velocity sensor detects the user's head motion events and notifies the microprocessor to receive an angular velocity data, and the microprocessor determines which direction of motion or preset action event occurred according to a motional characteristic, and encodes the user's head motion events into key values of a standard input device (including a mouse and a keyboard), the displacement calculated according to an angular velocity is encoded as an axis code, and then packaged as data packages according to a user interface protocol (including a Human Interface Device protocol), finally, the data packages are sent to the controlled electronic device through the wireless or wired connectivity;

wherein a microphone and an audio codec existing in the earphone are used, the microphone picks up an analog audio signal, and sends the analog audio signal to the audio codec for A/D conversion;

wherein the microprocessor processes a digital sound data from the audio codec, wherein the microprocessor judges that a received sound amplitude is greater than a certain threshold within a certain duration, then a sound input event is considered to have occurred, thus, more control is obtained by a combination of a sound input and a head motion input, so that a user whistles and lifts head up to zoom in a picture, whistles and puts head down to zoom out the picture.

* * * * *